United States Patent
Bearden (10) Patent No.: US 7,117,309 B2
(45) Date of Patent: Oct. 3, 2006

(54) METHOD OF DETECTING SEQUENTIAL WORKLOADS TO INCREASE HOST READ THROUGHPUT

(75) Inventor: Brian S. Bearden, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 228 days.

(21) Appl. No.: 10/414,195

(22) Filed: Apr. 14, 2003

(65) Prior Publication Data

US 2004/0205300 A1 Oct. 14, 2004

(51) Int. Cl.
*G06F 12/00* (2006.01)
(52) U.S. Cl. .................. 711/137; 711/202; 711/204; 711/213; 711/217; 711/218
(58) Field of Classification Search ............ 711/3, 711/113, 137, 204
See application file for complete search history.

(56) References Cited

U.S. PATENT DOCUMENTS

| | | | | |
|---|---|---|---|---|
| 5,958,040 | A * | 9/1999 | Jouppi ................ | 712/207 |
| 6,173,392 | B1 * | 1/2001 | Shinozaki ............ | 712/207 |
| 6,754,799 | B1 * | 6/2004 | Frank ................. | 711/216 |
| 2003/0105939 | A1 * | 6/2003 | Cooksey et al. ...... | 711/203 |
| 2004/0003179 | A1 * | 1/2004 | Shirahige et al. .... | 711/137 |
| 2004/0148470 | A1 * | 7/2004 | Schulz ................ | 711/137 |
| 2004/0268051 | A1 * | 12/2004 | Berg et al. .......... | 711/137 |

OTHER PUBLICATIONS

Adams, April; "IBM Enterprise Storage Server Models F10/F20"; ZDNet; Jan. 7, 2002; 5 pages; http://techupdate.zonet.com/techupdate/stories/main/0,14179,2836789,00.html.

Revel, Dan; McNamee, Dylan; Pu, Calton; Steere, David; Walpole, Johnathan; "Feedback-based Dynamic Proportion Allocation for Disk I/O"; Department of Computer Science and Engineering, Oregon Graduate Institute of Science and Technology; Dec. 7, 2002; 5 pages.

Suh, G.E.; Rudolph, Larry; Devadas, Srinivas; "Dynamic Partitioning of Shared Cache Memory"; Klumer Academic Publisher, Netherlands; 2002; 23 pages.

Grimsrud, Knut Stener; Archibald, James K.; Nelson, Brent E; "Multiple Prefetch Adaptive Disk Caching"; IEEE Transaction on Knowledge and Data Engineering, vol. 5, Feb. 1993; pp. 88-103.

Suh, G. E.; Rudolph, Larry; Devadas, Srinivas; "Dynamic Cache Partitioning for Simultaneious Mutithreading Systems"; Proceedings of the IASTED International Conference on Parallel and Distributed Computing and Systems (PDCS2001); Aug. 2001; 7 pages.

* cited by examiner

*Primary Examiner*—Mano Padmanabhan
*Assistant Examiner*—Jasmine Song (57) ABSTRACT

Exemplary systems and methods analyze cache data to detect a sequential workload to facilitate pre-fetching effectiveness. An exemplary address analysis module for sequential workload detection generates one or more addresses related to a host address. If the cache memory contains data corresponding to one or more of the related addresses, a sequential workload may be occurring, and a read pre-fetch operation may be triggered. An indexing module may be used to map host and related addresses to corresponding indices in cache memory.

22 Claims, 7 Drawing Sheets

METHOD OF DETECTING SEQUENTIAL WORKLOADS TO INCREASE HOST READ THROUGHPUT

CROSS REFERENCE TO RELATED APPLICATIONS

The present application contains subject matter related to the following co-pending applications: Ser. No. 10/414,180 "Method of Cache Collision Avoidance in the Presence of a Periodic Cache Aging Algorithm," Ser. No. 10/414,189 "Method of Adaptive Read Cache Pre-Fetching to Increase Host Read Throughput," Ser. No. 10/414,188 "Method of Adaptive Cache Partitioning to Increase Host I/O Performance, and Ser. No. 10/414,194 "Method of Triggering Read Cache Pre-Fetch to Increase Host Read Throughput,". The foregoing applications are incorporated by reference herein, assigned to the same assignee as this application and filed on even date herewith.

TECHNICAL FIELD

The present disclosure relates to data storage, and more particularly, to detecting a sequential workload.

BACKGROUND

Computer data storage devices, such as disk drives and Redundant Array of Independent Disks (RAID), typically use a cache memory in combination with mass storage media (e.g., magnetic tape or disk) to save and retrieve data in response to requests from a host device. Cache memory, often referred to simply as "cache", offers improved performance over implementations without cache. Cache typically includes one or more integrated circuit memory device(s), which provide a very high data rate in comparison to the data rate of non-cache mass storage medium. Due to unit cost and space considerations, cache memory is usually limited to a relatively small fraction of (e.g., 256 kilobytes in a single disk drive) mass storage medium capacity (e.g., 256 Gigabytes). As a result, the limited cache memory should be used as efficiently and effectively as possible.

Cache is typically used to temporarily store data that is the most likely to be requested by a host computer. By read pre-fetching (i.e., retrieving data from the host computer's mass storage media ahead of time) data before the data is requested, data rate may be improved. Cache is also used to temporarily store data from the host device that is destined for the mass storage medium. When the host device is saving data, the storage device saves the data in cache at the time the host computer requests a write. The storage device typically notifies the host that the data has been saved, even though the data has been stored in cache only; later, such as during an idle time, the storage device "de-stages" data from cache (i.e., moves the data from cache to mass storage media). Thus, cache is typically divided into a read cache portion and a write cache portion. Data in cache is typically processed on a page basis. The size of a page can vary and is generally implementation specific; a typical page size is 64 kilobytes.

Generally, storage device performance improves as read cache hit rate goes up. Read cache hit rate is a measure of frequency of accessing the read cache rather than the mass media (e.g., a disk). As is generally understood, the mass media typically takes much longer to access than the read cache. Thus, by increasing the read cache hit rate, data input/output (I/O) rate to the host can be increased. In order to take advantage of the relatively faster read cache, typical storage devices attempt to predict what data a host device will request in the near future and have that data available in the cache when the host actually requests it.

Typical storage devices attempt to identify "sequential workloads" during operation in order to predict which data the host will request. A sequential workload is generally a host workload that includes request(s) for data at logical addresses that are substantially sequential. After detecting a sequential workload, the storage device can read ahead in the host address memory space, and pre-fetch sequential data into the read cache. Pre-fetching data involves reading data from the mass storage media before the data is requested from the host and storing that data in the read cache. By reading ahead and pre-fetching data, system performance can be improved, particularly when a host is accessing a relatively large and/or contiguous blocks of data, such as a text or video document.

One problem with existing systems relates to detecting sequential workloads. Typical systems employ processes for detecting sequential workloads that are highly resource consuming. Typically, a number of host requests are stored in memory. Addresses associated with the number of host requests are sorted, typically in numerical order. After sorting, the storage device employs algorithm(s) to identify a sequential pattern in the addresses. A number of sequential pattern recognition algorithms based on sorted addresses are known and used. The memory required to separately store host requests, and the processor time and memory required to sort and identify pattern(s) in the request addresses can result in inefficient use of storage device resources. Any resource (e.g., memory or processor time) that is used to detect a sequential workload, therefore, may not be available for host I/O.

Thus, traditional methods of detecting sequential workloads, and thus, taking advantage of the benefits of read cache pre-fetching, typically utilize existing storage device resources inefficiently.

SUMMARY

It is with respect to the foregoing and other considerations, that various exemplary systems, devices and/or methods have been developed and are presented herein.

One exemplary implementation includes a method of receiving a request for data associated with a first address, and determining whether to pre-fetch data based at least in part on data that is in a cache memory.

Another exemplary implementation includes a storage device with a cache memory and a module operable to determine whether the cache memory has data associated with one or more addresses that are related to a requested address.

DETAILED DESCRIPTION

Various exemplary systems, devices and methods are described herein, which employ a module(s) for detecting sequential workloads. Generally, one or more module(s) employ operations to detect a sequential workload based on cache contents. More specifically, an exemplary address analysis module determines whether cache contents correspond to related addresses. Still more specifically, if cache contents correspond to the related addresses, data associated with another related address is pre-fetched. More specifically still, a cache indexing operation may involve generating cache indices corresponding to the related addresses. More specifically still, the number and/or relationship criteria of related addresses may be dynamically adjusted based on one or more operational parameters.

Figure 1:
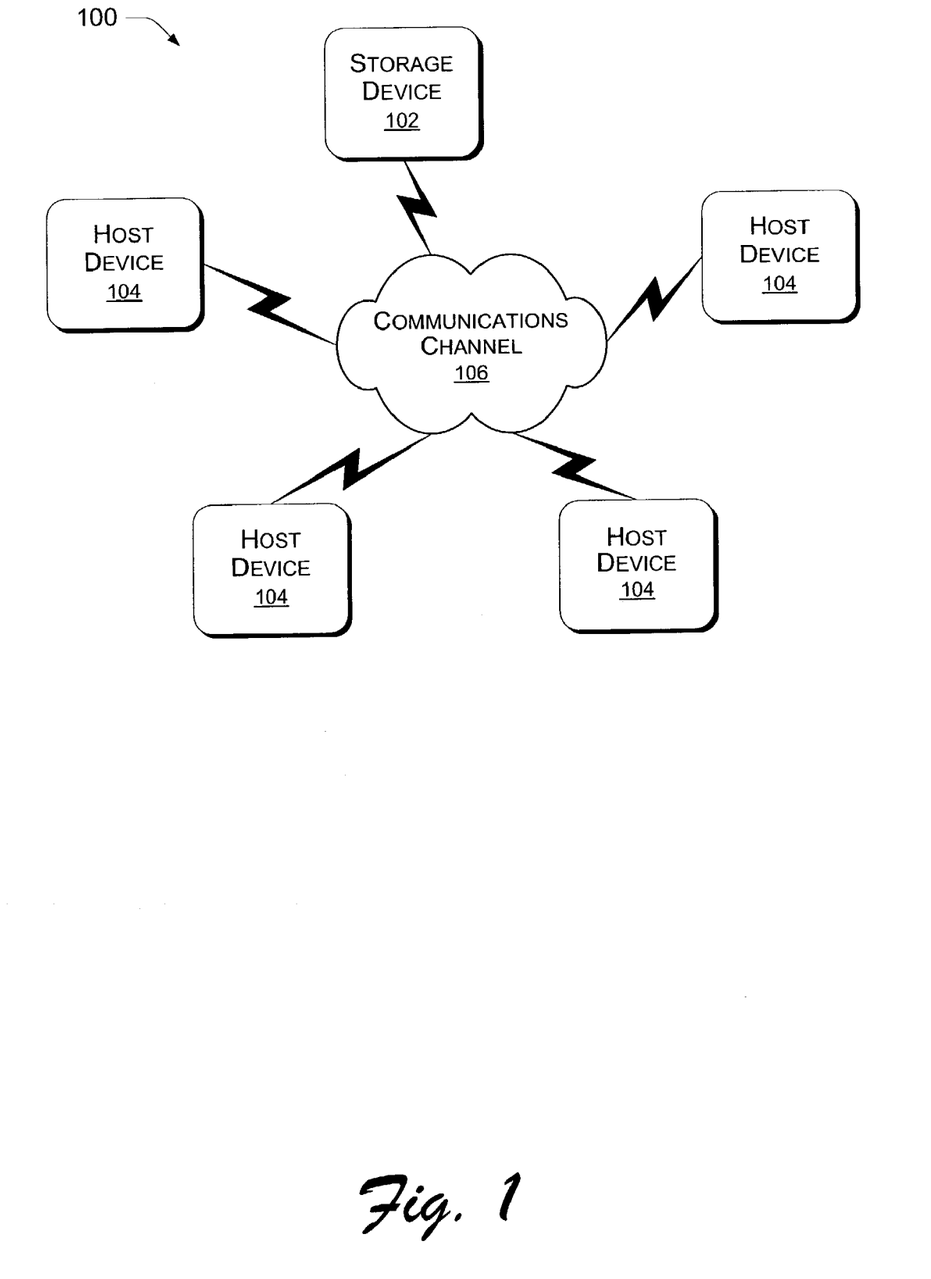
FIG. 1 illustrates a system environment that is suitable for managing cache in a storage device such that cache collisions are minimized.

FIG. 1 illustrates a suitable system environment 100 for detecting sequential workloads that may arise from one or more host devices 104. The storage device 102 may utilize cache memory in responding to request(s) from the one or more host devices 104. Efficient detection of sequential workloads facilitates effective usage of cache memory in the storage device 102. By detecting sequential workloads, storage performance goals are more likely achieved than if sequential workloads are not detected.

Storage performance goals may include mass storage, low cost per stored megabyte, high input/output performance, and high data availability through redundancy and fault tolerance. The storage device 102 may be an individual storage system, such as a single hard disk drive, or the storage device 102 may be an arrayed storage system having more than one storage system or device. Thus, the storage devices 102 can include one or more storage components or devices operatively coupled within the storage device 102, such as magnetic disk drives, tape drives, optical read/write disk drives, solid state disks and the like.

The system environment 100 of FIG. 1 includes a storage device 102 operatively coupled to one or more host device(s) 104 through a communications channel 106. The communications channel 106 can be wired or wireless and can include, for example, a LAN (local area network), a WAN (wide area network), an intranet, the Internet, an extranet, a fiber optic cable link, a direct connection, or any other suitable communication link. Host device(s) 104 can be implemented as a variety of general purpose computing devices including, for example, a personal computer (PC), a laptop computer, a server, a Web server, and other devices configured to communicate with the storage device 102.

In one implementation, the host 104 transmits requests to the storage device 102 to store and/or retrieve data on and from the storage device 102. One type of request the host 104 may make is a read request to read data from the storage device 102. The read request may indicate an address from which to retrieve data in the storage device 102. In one implementation, the host address is in the form of a logical block address (LBA). The host address may also include a logical unit (LUN), indicating a particular storage unit in the storage device. Other forms of host addresses may be employed.

Whatever the form of the host address, the storage device 102 receives the read request and uses the host address to retrieve the requested data from a mass storage media (such as a disk or tape) or a cache memory. The storage device 102 may parse the read request into various component parts, such as the address and the amount of data requested. In one implementation, the storage device then determines whether the requested data is in the cache memory, and if so, retrieves the requested data from the cache memory; however, if the requested data is not in the cache memory, the storage device 102 retrieves the data from the mass storage media. In a particular disk drive implementation, retrieving the data from the disk(s) involves mapping the given host address (such as LBA/LUN) to another form, such as Physical Cylinder/Head/Sector (PCHS) where the requested data actually resides.

Various exemplary systems and/or methods disclosed herein may apply to various types of storage devices 102 that employ a range of storage components as generally discussed above. In addition, storage devices 102 as disclosed herein may be virtual storage array devices that include a virtual memory storage feature. Thus, the storage devices 102 presently disclosed may provide a layer of address mapping indirection between host 104 addresses and the actual physical addresses where host 104 data is stored within the storage device 102. Address mapping indirection may use pointers or other dereferencing, which make it possible to move data around to different physical locations within the storage device 102 in a way that is transparent to the host 104.

As an example, a host device 104 may store data at host address $H_5$, which the host 104 may assume is pointing to the physical location of sector #56 on disk #2 on the storage device 102. However, the storage device 102 may move the host data to an entirely different physical location (e.g., disk #9, sector #27) within the storage device 102 and update a pointer (i.e., layer of address indirection) so that it always points to the host data. The host 104 may continue accessing the data using the same host address $H_5$, without having to know that the data has actually resides at a different physical location within the storage device 102.

In addition, the storage device 102 may utilize cache memory to facilitate rapid execution of read and write operations. When the host device 104 accesses data using a host address (e.g., $H_5$), the storage device may access the data in cache, rather than on mass storage media (e.g., disk or tape). Thus, the host 104 is not necessarily aware that data read from the storage device 102 may actually come from a read cache or data sent to the storage device 102 may actually be stored temporarily in a write cache. When data is stored temporarily in write cache, the storage device 102 may notify the host device 104 that the data has been saved, and later de-stage, or write the data from the write cache onto mass storage media.

Figure 2:
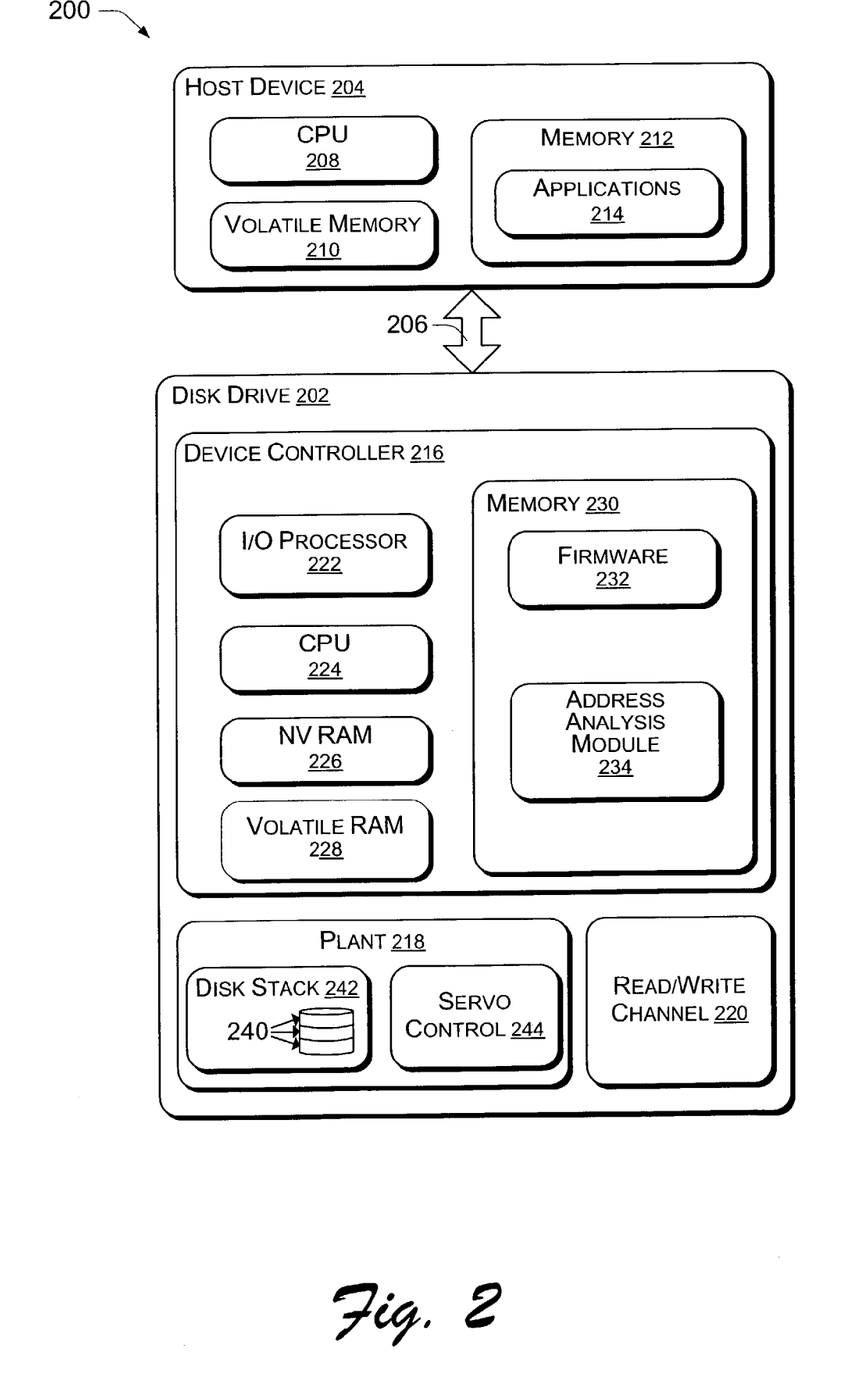
FIG. 2 is a block diagram illustrating in greater detail, a particular implementation of a host computer device and a storage device as might be implemented in the system environment of FIG. 1.

FIG. 2 is a functional block diagram illustrating a particular implementation of a host computer device 204 and a storage device 202 as might be implemented in the system environment 100 of FIG. 1. The storage device 202 of FIG. 2 is embodied as a disk drive. While the methods and systems for detecting sequential workloads are discussed in FIG. 2 with respect to a disk drive implementation, it will be understood by one skilled in the art that the methods and systems may be applied to other types of storage devices, such as tape drives, CD-ROM, and others.

The host device 204 is embodied generally as a computer such as a personal computer (PC), a laptop computer, a server, a Web server, or other computer device configured to communicate with the storage device 202. The host device 204 typically includes a processor 208, a volatile memory 210 (i.e., RAM), and a nonvolatile memory 212 (e.g., ROM, hard disk, floppy disk, CD-ROM, etc.). Nonvolatile memory 212 generally provides storage of computer readable instructions, data structures, program modules and other data for the host device 204. The host device 204 may implement various application programs 214 stored in memory 212 and executed on the processor 208 that create or otherwise access data to be transferred via a communications channel 206 to the disk drive 202 for storage and subsequent retrieval.

Such applications 214 might include software programs implementing, for example, word processors, spread sheets, browsers, multimedia players, illustrators, computer-aided design tools and the like. Thus, host device 204 provides a regular flow of data I/O requests to be serviced by the disk drive 202. The communications channel 206 may be any bus structure/protocol operable to support communications between a computer and a disk drive, including, Small Computer System Interface (SCSI), Extended Industry Standard Architecture (EISA), Peripheral Component Interconnect (PCI), Attachment Packet Interface (ATAPI), and the like.

The disk drive 202 is generally designed to provide data storage and data retrieval for computer devices such as the host device 204. The disk drive 202 may include a controller 216 that permits access to the disk drive 202. The controller 216 on the disk drive 202 is generally configured to interface with a disk drive plant 218 and a read/write channel 220 to access data on one or more disk(s) 240. Thus, the controller 216 performs tasks such as attaching validation tags (e.g., error correction codes (ECC)) to data before saving it to disk(s) 240 and checking the tags to ensure data from a disk(s) 240 is correct before sending it back to host device 104. The controller 216 may also employ error correction that involves recreating data that may otherwise be lost during failures.

The plant 218 is used herein to include a servo control module 244 and a disk stack 242. The disk stack 242 includes one or more disks 240 mounted on a spindle (not shown) that is rotated by a motor (not shown). An actuator arm (not shown) extends over and under top and bottom surfaces of the disk(s) 240, and carries read and write transducer heads (not shown), which are operable to read and write data from and to substantially concentric tracks (not shown) on the surfaces of the disk(s) 240.

The servo control module 244 is configured to generate signals that are communicated to a voice coil motor (VCM) that can rotate the actuator arm, thereby positioning the transducer heads over and under the disk surfaces. The servo control module 244 is generally part of a feedback control loop that substantially continuously monitors positioning of read/write transducer heads and adjusts the position as necessary. As such, the servo control module 244 typically includes filters and/or amplifiers operable to condition positioning and servo control signals. The servo control module 244 may be implemented in any combination of hardware, firmware, or software.

The definition of a disk drive plant can vary somewhat across the industry. Other implementations may include more or fewer modules in the plant 218; however, the general purpose of the plant 218 is to provide the control to the disk(s) 240 and read/write transducer positioning, such that data is accessed at the correct locations on the disk(s). The read/write channel 220 generally communicates data between the device controller 216 and the transducer heads (not shown). The read/write channel may have one or more signal amplifiers that amplify and/or condition data signals communicated to and from the device controller 216.

Generally, accessing the disk(s) 240 is a relatively time-consuming task in the disk drive 202. The time-consuming nature of accessing (i.e., reading and writing) the disk(s) 240 is at least partly due to the electromechanical processes of positioning the disk(s) 240 and positioning the actuator arm. Time latencies that are characteristic of accessing the disk(s) 240 are more or less exhibited by other types of mass storage devices that access mass storage media, such as tape drives, optical storage devices, and the like.

As a result, mass storage devices, such as the disk drive 202, may employ cache memory to facilitate rapid data I/O responses to the host 204. Cache memory, discussed in more detail below, may be used to store pre-fetched data from the disk(s) 240 that will most likely be requested in the near future by the host 204. Cache may also be used to temporarily store data that the host 204 requests to be stored on the disk(s) 240.

The controller 216 on the storage device 202 typically includes I/O processor(s) 222, main processor(s) 224, volatile RAM 228, nonvolatile (NV) RAM 226, and nonvolatile memory 230 (e.g., ROM, flash memory). Volatile RAM 228 provides storage for variables during operation, and may store read cache data that has been pre-fetched from mass storage. NV RAM 226 may be supported by a battery backup (not shown) that preserves data in NV RAM 222 in the event power is lost to controller(s) 216. As such, NV RAM 226 generally stores data that should be maintained in the event of power loss, such as write cache data. Nonvolatile memory 230 may provide storage of cached data, computer readable instructions, data structures, program modules and other data for storage device 202.

Accordingly, the nonvolatile memory 230 includes firmware 232, an address analysis module 234 that analyzes addresses, such as host request addresses and cache addresses, to facilitate detection of sequential host workloads. Firmware 232 is generally configured to execute on the processor(s) 224 and support normal storage device 202 operations. Firmware 232 may also be configured to handle various fault scenarios that may arise in the disk drive 202. In the implementation of FIG. 2, the address analysis module 234 is configured to execute on the processor(s) 224 to analyze host addresses and related addresses as they might correspond to data in the cache, as more fully discussed herein below.

The I/O processor(s) 222 receives data and commands from the host device 204 via the communications channel 206. The I/O processor(s) 222 communicate with the main processor(s) 224 through standard protocols and interrupt procedures to transfer data and commands between NV RAM 226 and the read/write channel 220 for storage of data on the disk(s) 240.

As indicated above, the implementation of a storage device 202 as illustrated by the disk drive 202 in FIG. 2, includes an address analysis module 234 and cache. The address analysis module 234 is configured to perform several tasks during the normal operation of storage device 202.

One of the tasks that the address analysis module 234 may perform is that of generating addresses that are related to addresses accessed by the host 204. The address analysis module 234 may cause a read pre-fetch operation if data in the cache corresponds to the related addresses. The address analysis module 234 may map host requests to cache indices that reference locations in the cache.

Read cache pre-fetching generally includes fetching data from a mass storage media, such as one or more disk(s), before a host requests the data. The pre-fetched data may be stored in a cache memory to facilitate rapid output when the host requests the data. The pre-fetched data may be fetched, stored, and retrieved on a page-by-page, or line-by-line basis. The size of a page may be any amount of data suitable for a particular implementation. Pre-fetching may also include updating an index table (such as a hash table) that relates host addresses to data that resides in the cache. Read cache pre-fetching may be carried out by executable code, executing a pre-fetching process on the CPU 224.

Figure 3:
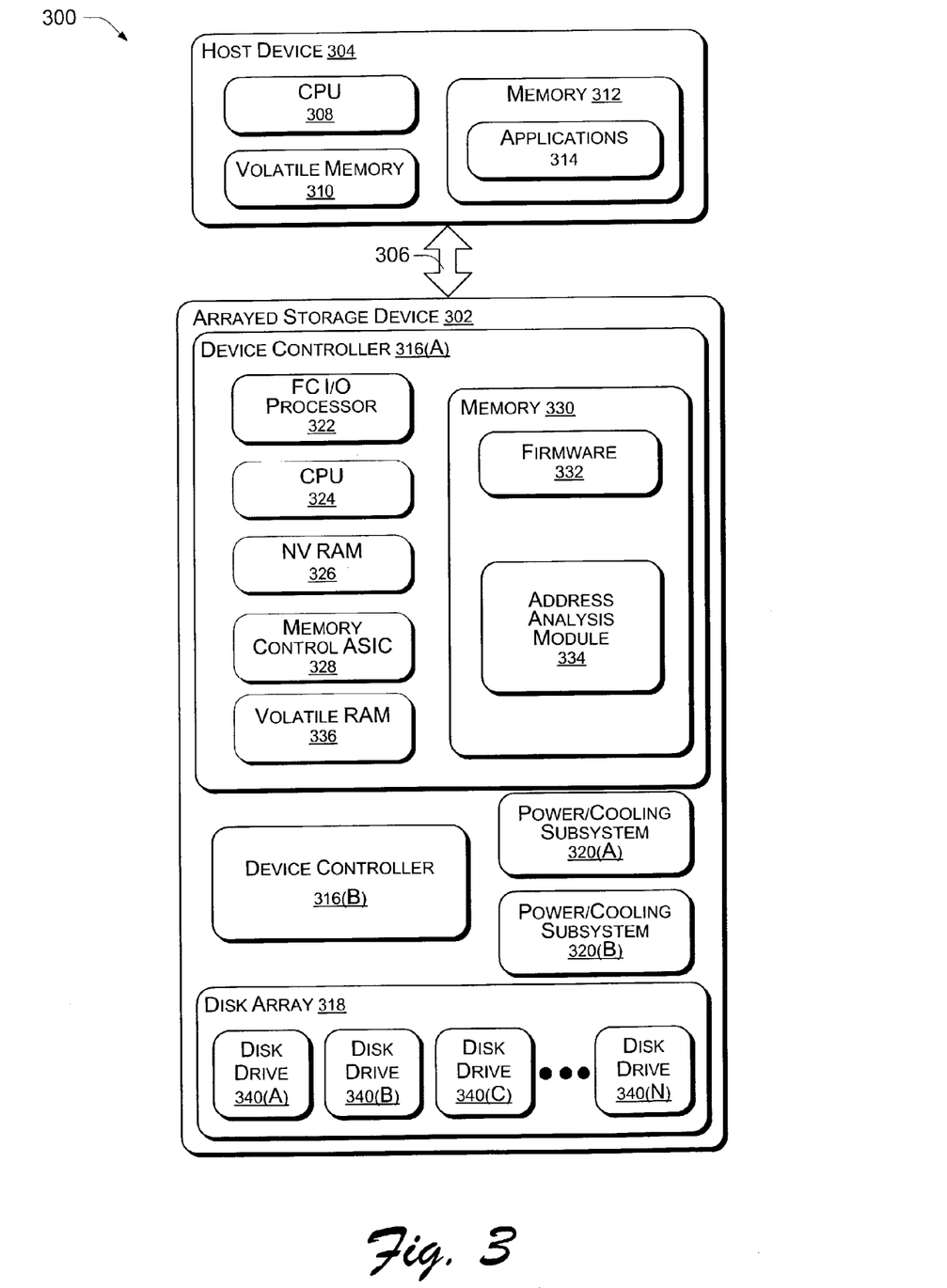
FIG. 3 is a block diagram illustrating in greater detail, another implementation of a host computer device and a storage device as might be implemented in the system environment of FIG. 1.

FIG. 2 illustrates an implementation involving a single disk drive 202. An alternative implementation may be a Redundant Array of Independent Disks (RAID), having an array of disk drives and more than one controller. As is discussed below, FIG. 3 illustrates an exemplary RAID implementation.

RAID systems are specific types of virtual storage arrays, and are known in the art. RAID systems are currently implemented, for example, hierarchically or in multi-level arrangements. Hierarchical RAID systems employ two or more different RAID levels that coexist on the same set of disks within an array. Generally, different RAID levels provide different benefits of performance versus storage efficiency.

For example, RAID level 1 provides low storage efficiency because disks are mirrored for data redundancy, while RAID level 5 provides higher storage efficiency by creating and storing parity information on one disk that provides redundancy for data stored on a number of disks. However, RAID level 1 provides faster performance under random data writes than RAID level 5 because RAID level 1 does not require the multiple read operations that are necessary in RAID level 5 for recreating parity information when data is being updated (i.e. written) to a disk.

Hierarchical RAID systems use virtual storage to facilitate the migration (i.e., relocation) of data between different RAID levels within a multi-level array in order to maximize the benefits of performance and storage efficiency that the different RAID levels offer. Therefore, data is migrated to and from a particular location on a disk in a hierarchical RAID array on the basis of which RAID level is operational at that location. In addition, hierarchical RAID systems determine which data to migrate between RAID levels based on which data in the array is the most recently or least recently written or updated data. Data that is written or updated least recently may be migrated to a lower performance, higher storage-efficient RAID level, while data that is written or updated the most recently may be migrated to a higher performance, lower storage-efficient RAID level.

In order to facilitate efficient data I/O, many RAID systems utilize read cache and write cache. The read and write cache of an arrayed storage device is generally analogous to the read and write cache of a disk drive discussed above. Caching in an arrayed storage device, however, is complicated by the fact that it introduces another layer of caching in addition to the caching that may be performed by the underlying disk drives. In order to take full advantage of the benefits offered by an arrayed storage device, such as speed and redundancy, an address analysis system advantageously increases the likelihood of a read cache hit. The implementation discussed with respect to FIG. 3 includes an address analysis system for efficient detection of sequential host workloads based in part on contents of cache.

FIG. 3 is a functional block diagram illustrating a suitable environment 300 for an implementation including an arrayed storage device 302 in accordance with the system environment 100 of FIG. 1. "Arrayed storage device" 302 and its variations, such as "storage array device", "array", "virtual array" and the like, are used throughout this disclosure to refer to a plurality of storage components/devices being operatively coupled for the general purpose of increasing storage performance. The arrayed storage device 302 of FIG. 3 is embodied as a virtual RAID (redundant array of independent disks) device. A host device 304 is embodied generally as a computer such as a personal computer (PC), a laptop computer, a server, a Web server, a handheld device (e.g., a Personal Digital Assistant or cellular phone), or any other computer device that may be configured to communicate with RAID device 302.

The host device 304 typically includes a processor 308, a volatile memory 316 (i.e., RAM), and a nonvolatile memory 312 (e.g., ROM, hard disk, floppy disk, CD-ROM, etc.). Nonvolatile memory 312 generally provides storage of computer readable instructions, data structures, program modules and other data for host device 304. The host device 304 may implement various application programs 314 stored in memory 312 and executed on processor 308 that create or otherwise access data to be transferred via network connection 306 to the RAID device 302 for storage and subsequent retrieval.

The applications 314 might include software programs implementing, for example, word processors, spread sheets, browsers, multimedia players, illustrators, computer-aided design tools and the like. Thus, the host device 304 provides a regular flow of data I/O requests to be serviced by virtual RAID device 302.

RAID devices 302 are generally designed to provide continuous data storage and data retrieval for computer devices such as the host device(s) 304, and to do so regardless of various fault conditions that may occur. Thus, a RAID device 302 typically includes redundant subsystems such as controllers 316(A) and 316(B) and power and cooling subsystems 320(A) and 320(B) that permit continued access to the disk array 302 even during a failure of one of the subsystems. In addition, RAID device 302 typically provides hot-swapping capability for array components (i.e. the ability to remove and replace components while the disk array 318 remains online) such as controllers 316(A) and 316(B), power/cooling subsystems 320(A) and 320(B), and disk drives 340 in the disk array 318.

Controllers 316(A) and 316(B) on RAID device 302 mirror each other and are generally configured to redundantly store and access data on disk drives 340. Thus, controllers 316(A) and 316(B) perform tasks such as attaching validation tags to data before saving it to disk drives 340 and checking the tags to ensure data from a disk drive 340 is correct before sending it back to host device 304. Controllers 316(A) and 316(B) also tolerate faults such as disk drive 340 failures by recreating data that may be lost during such failures.

Controllers 316 on RAID device 302 typically include I/O processor(s) such as FC (fiber channel) I/O processor(s) 322, main processor(s) 324, volatile RAM 336, nonvolatile (NV) RAM 326, nonvolatile memory 330 (e.g., ROM), and one or more application specific integrated circuits (ASICs), such as memory control ASIC 328. Volatile RAM 336 provides storage for variables during operation, and may store read cache data that has been pre-fetched from mass storage. NV RAM 326 is typically supported by a battery backup (not shown) that preserves data in NV RAM 326 in the event power is lost to controller(s) 316. NV RAM 326 generally stores data that should be maintained in the event of power loss, such as write cache data. Nonvolatile memory 330 generally provides storage of computer readable instructions, data structures, program modules and other data for RAID device 302.

Accordingly, nonvolatile memory 330 includes firmware 332, an address analysis module 334, that analyzes addresses, such as host request addresses and cache addresses, to facilitate detection of sequential host workloads. Firmware 332 is generally configured to execute on processor(s) 324 and support normal arrayed storage device 302 operations. In one implementation the firmware 332 includes array management algorithm(s) to make the internal complexity of the array 318 transparent to the host 304, map virtual disk block addresses to member disk block addresses so that I/O operations are properly targeted to physical storage, translate each I/O request to a virtual disk into one or more I/O requests to underlying member disk drives, and handle errors to meet data performance/reliability goals, including data regeneration, if necessary. In the implementation shown in FIG. 3, the address analysis module 334 is configured to execute on the processor(s) 324 and analyze host addresses to determine whether a sequential workload may be occurring based on the contents of cache.

The FC I/O processor(s) 322 receives data and commands from host device 304 via the network connection 306. FC I/O processor(s) 322 communicate with the main processor(s) 324 through standard protocols and interrupt procedures to transfer data and commands to redundant controller 316(B) and generally move data between volatile RAM 336, NV RAM 326 and various disk drives 340 in the disk array 318 to ensure that data is stored redundantly. The arrayed storage device 302 includes one or more communications channels to the disk array 318, whereby data is communicated to and from the disk drives 340. The disk drives 340 may be arranged in any configuration as may be known in the art. Thus, any number of disk drives 340 in the disk array 318 can be grouped together to form disk systems.

The memory control ASIC 328 generally controls data storage and retrieval, data manipulation, redundancy management, and the like through communications between mirrored controllers 316(A) and 316(B). Memory controller ASIC 328 handles tagging of data sectors being striped to disk drives 340 in the array of disks 318 and writes parity information across the disk drives 340. In general, the functions performed by ASIC 328 might also be performed by firmware or software executing on general purpose microprocessors. Data striping and parity checking are well-known to those skilled in the art.

The memory control ASIC 328 also typically includes internal buffers (not shown) that facilitate testing of memory 330 to ensure that all regions of mirrored memory (i.e. between mirrored controllers 316(A) and 316(B)) are compared to be identical and checked for ECC (error checking and correction) errors on a regular basis. The memory control ASIC 328 notifies the processor 324 of these and other errors it detects. Firmware 332 is configured to manage errors detected by memory control ASIC 328 in a tolerant manner which may include, for example, preventing the corruption of array 302 data or working around a detected error/fault through a redundant subsystem to prevent the array 302 from crashing.

Figure 4:
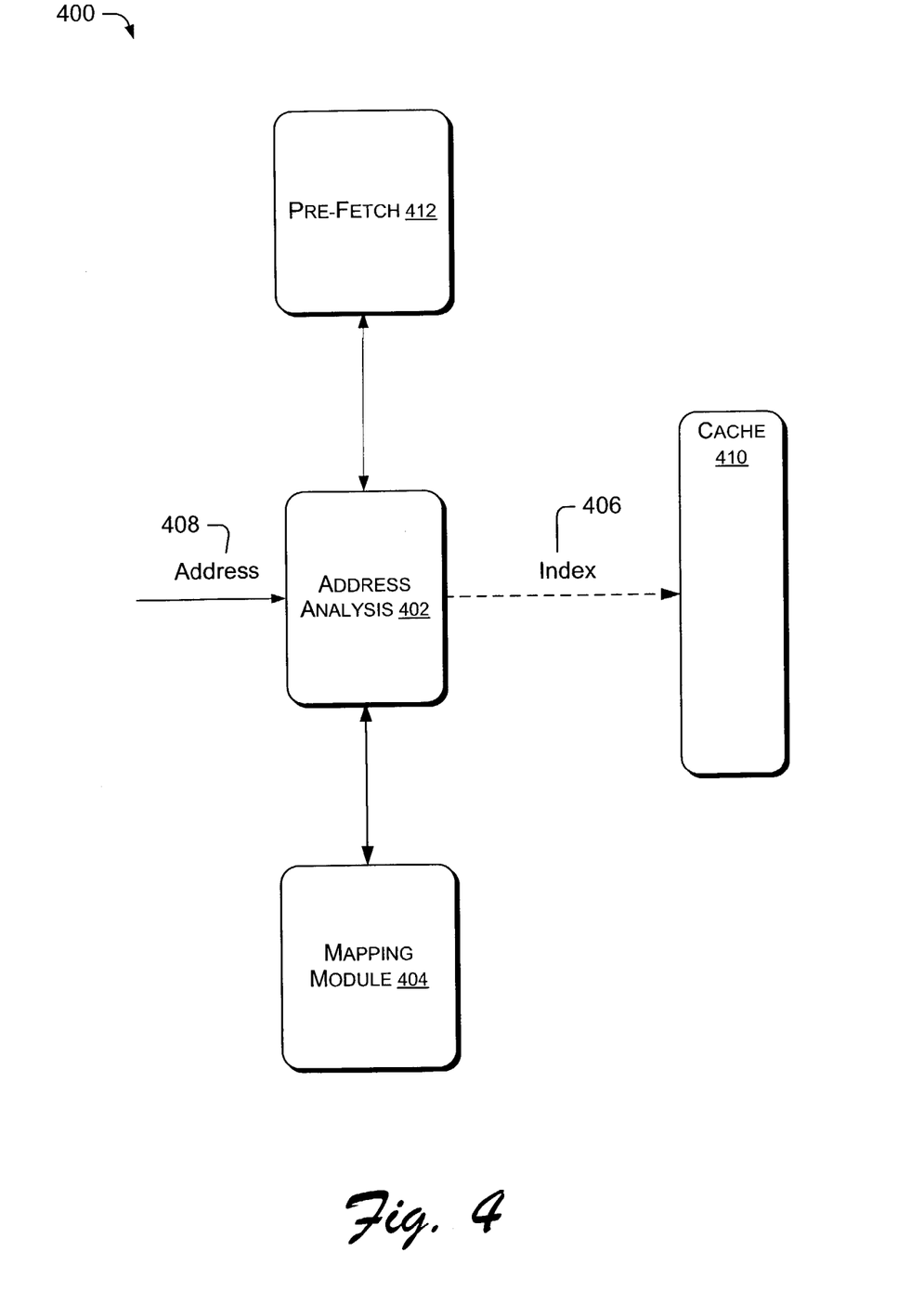
FIG. 4 illustrates an exemplary functional block diagram of a system that may reside in the system environments of FIGS. 1–3, wherein an address analysis module analyzes addresses with respect to cache contents to determine whether cache contents suggest a sequential workload.

FIG. 4 illustrates a functional block diagram of an exemplary cache management module 400 that may reside in the system environments of FIGS. 1–3, wherein an exemplary address analysis module 402 interfaces with a mapping module 404 to generate a cache index 406 based on an address 408. The address analyses module 402 may use the index 406 to determine whether contents in cache 410 suggest a sequential workload. The analysis module 402 may interface with a pre-fetch module 412, which is operable to initiate a read pre-fetch process.

The address analysis module 402 receives an input that includes an address 408. The address analysis module 402 may receive the input from an input/output module, such as the I/O processor 222 in FIG. 2. In one implementation, the address 408 is in a host address form. In another implementation, the address 408 is in a form different from the host address form. The address analysis module 402 may generate one or more addresses that are related to the input address 408.

In one implementation, the address analysis module 402 generates one or more addresses sequentially related to the input address 408. In this implementation, the address analysis module 402 may subtract a page offset from the input address 408. The address analysis module 402 may subtract an integer number of pages from the input address 408. For example, the analysis module 402 may subtract four pages from the input address 408 to obtain the sequentially related address. In addition, the address analysis module 408 may obtain related addresses that are sequentially related to previously-generated related addresses. For example, the address analysis module 402 may subtract four pages from the input address 408 to obtain a first sequentially related address, and later subtract four more pages from the first sequentially related address to obtain a second sequentially related address, and so on.

The presence of data in the cache 410 for a related address indicates that the data has been pre-fetched and stored in cache, and/or that the data was previously requested by a host. Thus, using the one or more sequentially related addresses, the address analysis module 402 may determine whether the cache 410 contains data corresponding to addresses that are sequentially related the input address 408. The address analysis module 402 might use an offset or index 406 into the cache 410 to determine whether a related address corresponds to data in the cache 410. In the implementation shown in FIG. 4, the analysis module 402 obtains the index 406 from the mapping module 404.

In another implementation, the address analysis module 402 may receive a cache index or other type of index as input. In this particular implementation, the index corresponds to a host address. The address analysis module 402 may use the index to generate an index 406 that is related to the input index. The related index is associated with a disc or cache address. Using the related index 406, the address analysis module 402 determines whether contents in the cache 410 correspond to the associated disc or cache address.

Thus, the address analysis module 402 may iteratively analyze a predetermined number of addresses (or indices, or corresponding data) that are sequentially related to a given host address. The number of addresses that are analyzed is implementation specific and may be adjusted depending on a number of usage or operational parameters. The number of addresses that are analyzed for sequentiality may be fixed (e.g., upon power-up), or it may be manually or automatically adjustable. Particular methods for automatically or dynamically adjusting the number of addresses for analysis are discussed below with respect to FIGS. 6 and FIG. 7.

In general, the mapping module 404 receives an input that identifies a unique address, such as the address 408, or a related address. Using the address identifier, the mapping module 404 might generate an associated cache index 406 into the cache 410 that has the data corresponding to the address 408, or the related address. In one implementation, the associated cache index 406 includes a node for the associated page in the cache 410, wherein the node has state information, lock information, and specifies where the data resides in the cache. In one implementation, the location of the page in the cache 410 is specified by a page offset. For example, the cache index 406 may point to a location in the cache 410 that is sixteen pages from a base address of the cache 410.

In a particular implementation of the mapping module 404, the mapping module 404 utilizes a hash table. The hash table may include one or more cache indices corresponding to addresses, such as the address 408, if the data corresponding to the address is in the cache 410. To utilize the hash table, the mapping module 404 may generate a unique hash key corresponding to the address 408. As an example, an LBA and LUN from the address 408 may be combined in such a way to yield the unique hash key. The hash key may then be input (or "hashed on") in the hash table. In this particular implementation, if the data corresponding to the address associated with hash key, the hash table provides a cache index that indicates a location in the cache 410 where the data resides. If the data is not in the cache 410, the hash table may generate an "absent" notification, such as a "null", or error flag.

Other implementations of the mapping module 404 employ mapping methods and/or structures in addition to, or other than a hash table. In one exemplary implementation of the mapping module 404, a skip list is used. Another implementation of the mapping module 404 includes a balanced tree structure to obtain indices into the cache 410. Yet another implementation of the mapping module 404 may include hardware having data structures that map a host request address to an index into the cache 410.

Regardless of the particular indexing scheme used by the mapping module 404 (i.e., a hash table, or otherwise), the index generated by the mapping module 404 is preferably current. That is, the index refers to data and/or mass storage media addresses that are currently in the cache 410. In one implementation, the mapping module 404 is updated during operation as data is fetched from the disk and stored in the cache 410. Particular methods of updating the mapping module 404 or any tables or indices therein to maintain currency are known by those skilled in the art, and the particular method used is not particularly relevant to the present discussion.

Based on data received from the mapping module 404 about the existence of data in the cache 410 the analysis module 402 might determine that data should be pre-fetched. In one implementation, the address analysis module 402 may detect a sequential workload if the address analysis module 402 determines that data in cache 410 corresponds to addresses that are related to the input address 408. In response to such detection, the analysis module 404 may communicate with a pre-fetch module 412.

A particular implementation of the pre-fetch module 412 initiates a read pre-fetch operation. In this implementation, the address analysis module 404 might call a function in the pre-fetch module. Alternatively, the address analysis module 404 may set up a process or thread that is executed by the pre-fetch module 412. Alternatively, the address analysis module 404 may set a flag that indicates to the pre-fetch module 412 that a read pre-fetch should execute. The address analysis module 402 may notify the pre-fetch module 412 of the address or addresses in mass storage media from which to fetch data. The address analysis module 402 may also indicate to the pre-fetch module 412 an address or addresses in the cache 410 where the pre-fetched data should be stored.

In another exemplary implementation, a pre-fetch read is treated similarly to a host read request by the cache management module 400. In this implementation, the host read request is satisfied by the cache 410 by retrieving the data from the mass storage media, placing the retrieved data in a free read cache buffer (e.g., a buffer in the cache 410), and handling the response from the disk read request.

The pre-fetch address(es) from which the pre-fetch module 412 fetches data may be related to the input address 408 and/or related addresses generated by the address analysis module 402. In one implementation, the pre-fetch address (es) are sequentially beyond the host address 408 on mass storage media. In this implementation, a predetermined amount of data (for example, an integer number of pages) logically farther than the address 408 into the host address space are retrieved from the mass storage media and stored into the cache 410. The data that is pre-fetched by the pre-fetch module 412 preferably is available in the cache 410 when a subsequent host read request arrives for that data.

The various modules illustrated in FIG. 4 may be implemented in any combination of software, hardware, or firmware. In addition, the exemplary modules, processes, and functions may be combined and/or separated in any way as is suitable to the implementation whereby the substantial utility of the system is still achieved.

Figure 5:
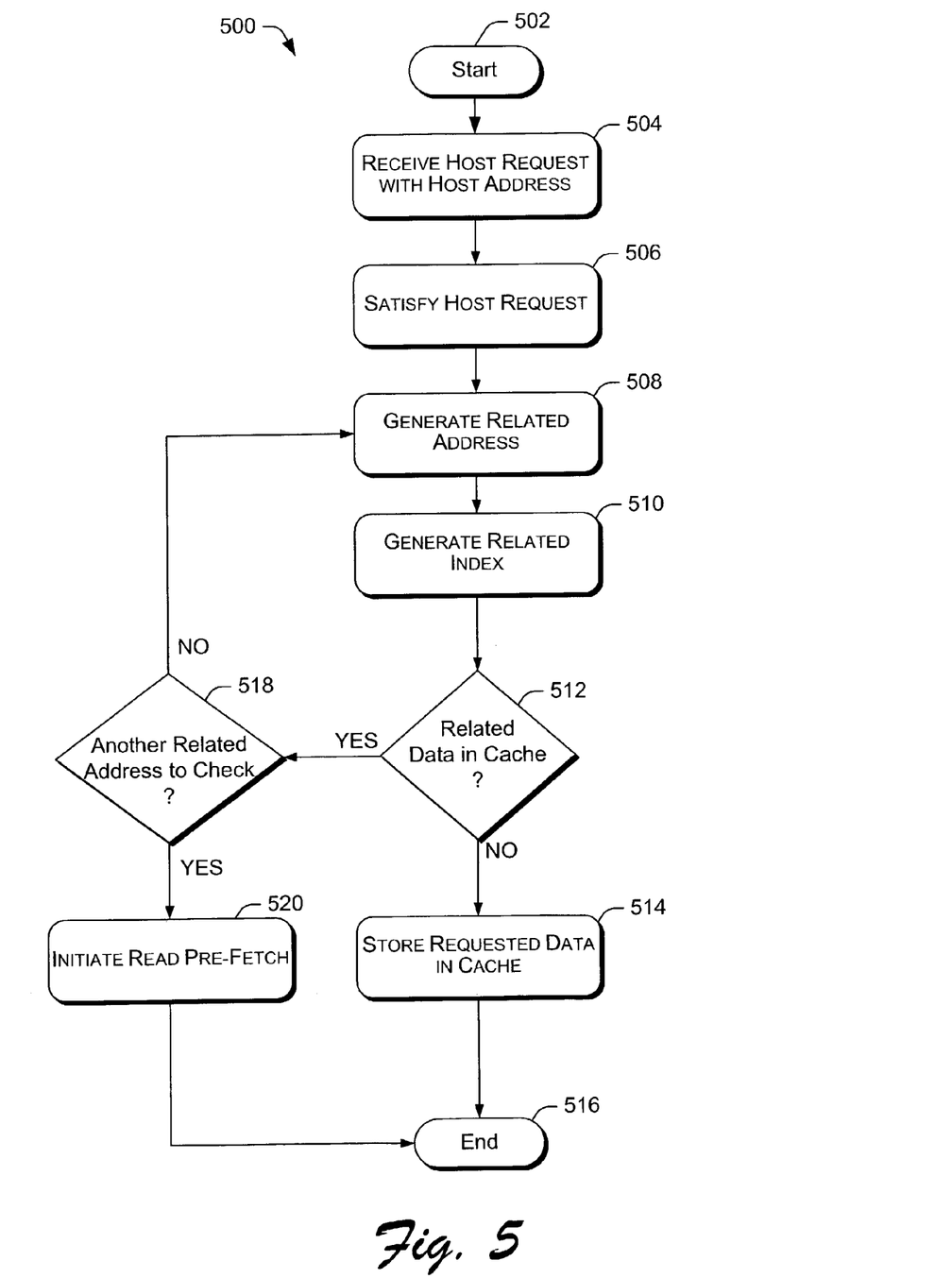
FIG. 5 illustrates an operational flow having exemplary operations that may be executed in the systems of FIGS. 1–4 for detecting a sequential workload based in part on the contents of cache.
Figure 6:
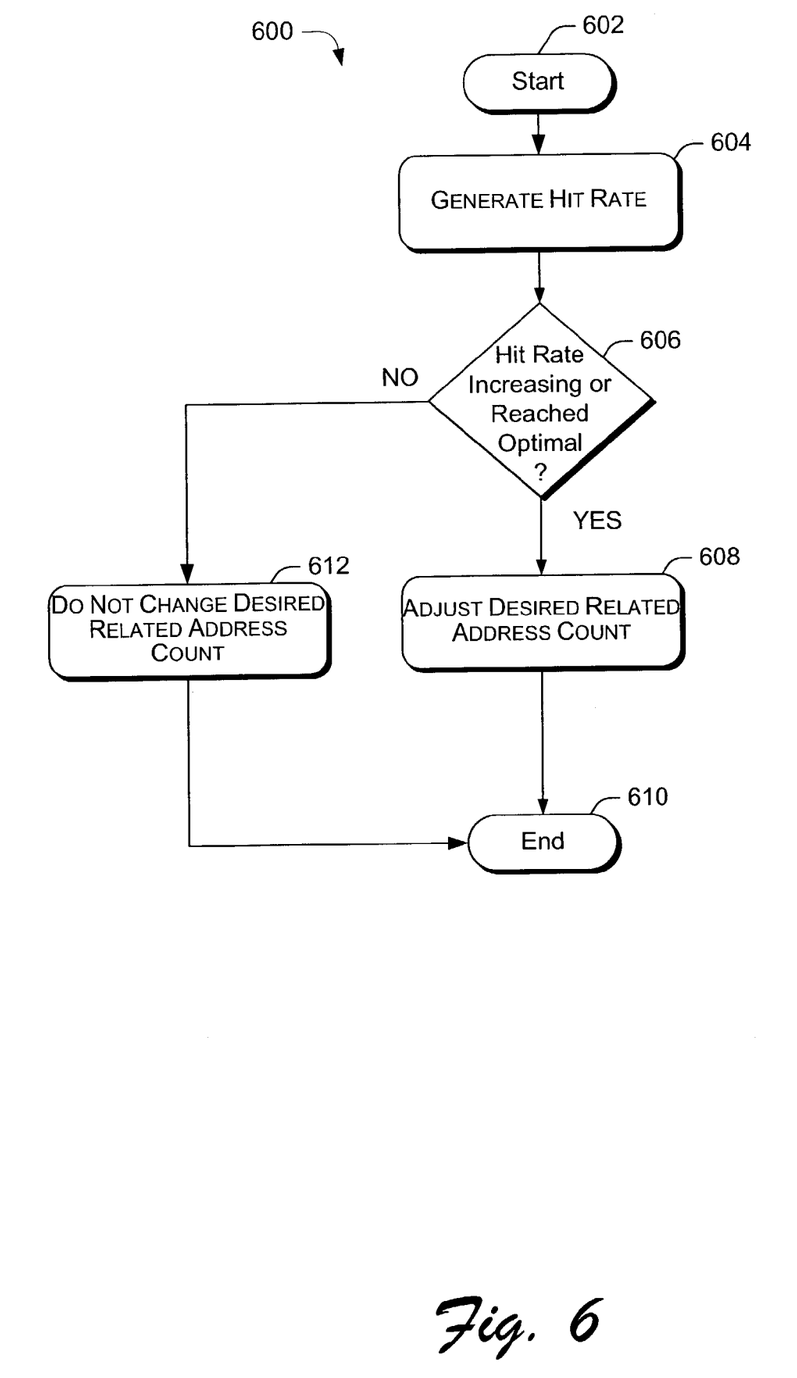
FIG. 6 illustrates an operational flow having exemplary operations that may be executed in the systems of FIGS. 1–4 for adjusting a look-back value based on cache hit rate.
Figure 7:
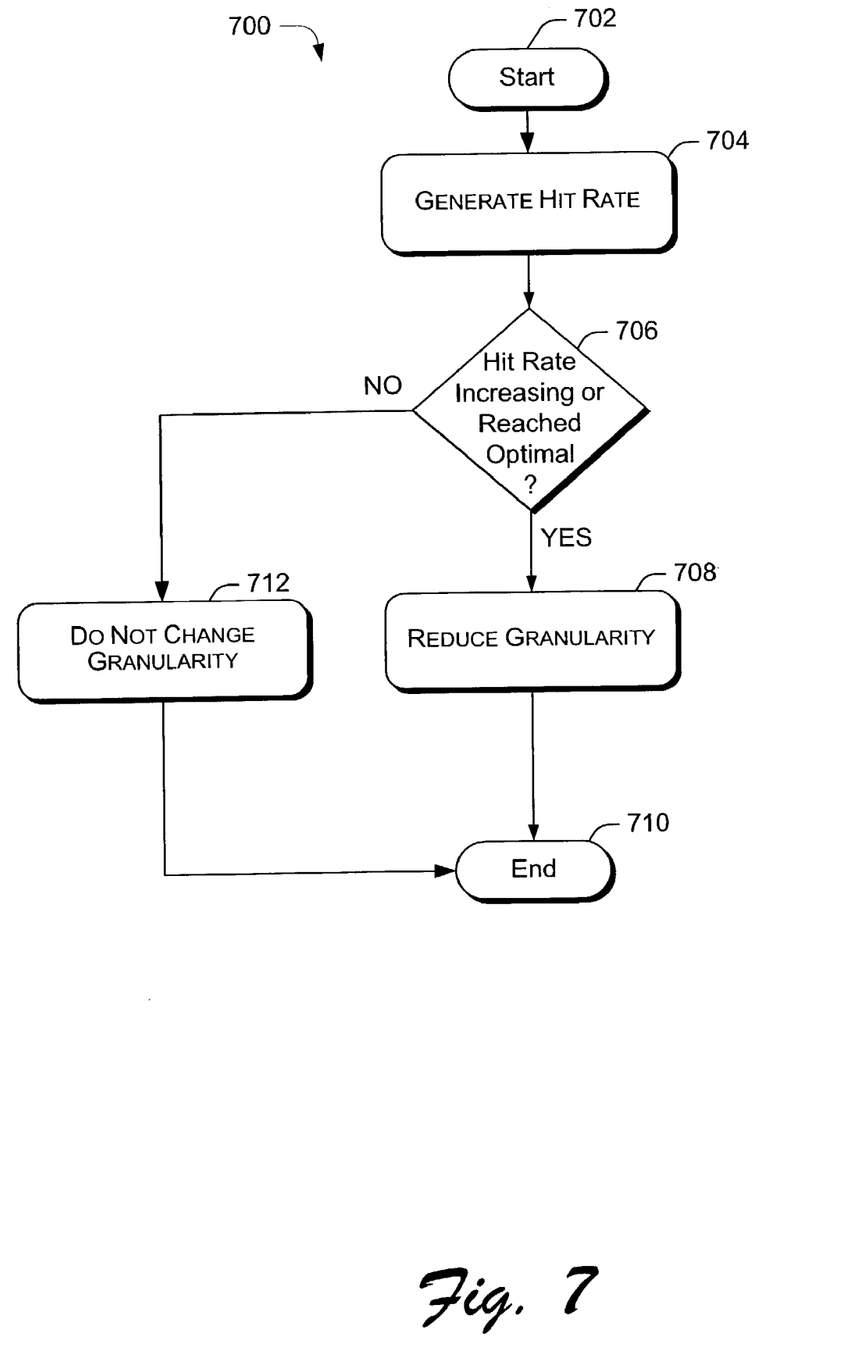
FIG. 7 illustrates an operational flow having exemplary operations that may be executed in the systems of FIGS. 1–4 for adjusting a page size based on cache hit rate.

FIGS. 5, 6 and 7 illustrate operational flows exemplifying various methods related to operations for detecting sequential host workloads. The operations shown in FIGS. 5, 6 and 7 may be implemented (1) as a sequence of microprocessor implemented acts or program modules running on one or more microprocessors and/or (2) as interconnected machine logic circuits or circuit modules. Alternatively, the operations shown in FIGS. 5, 6 and 7 may be implemented by other hardware, software or firmware in the storage device (e.g., 202, FIG. 2; 302 FIG. 3). Accordingly, the operations described may be referred to variously as operations, routines, structural devices, acts, or modules. The implementation of the operations shown in FIGS. 5, 6, and 7 is a matter of choice dependent on performance requirements and/or hardware and software capabilities of the storage device. It will be recognized by one skilled in the art that these operations may be implemented in software, in firmware, in special purpose digital logic, or any combination thereof without deviating from the spirit and scope of the present invention, as recited in the claims attached hereto. As used herein, computer readable medium may be any available medium that can store or embody processor-readable instructions.

FIG. 5 illustrates an exemplary operational flow 500 having exemplary operations that may be executed in the systems of FIGS. 1–4 for detecting a sequential workload based in part on the contents of cache. In general, the operation flow 500 determines if data corresponding to one or more addresses related to a requested address resides in cache memory, and, if so, a read pre-fetch operation may be initiated.

After a start operation 502, a receive operation 504 receives a request from a user, such as a host device (for example, the host device 104, FIG. 1, host device 204, FIG. 2, the host device 304, FIG. 3). The host request may be a request to read data associated with at least one host address. The host address may be in any form as may be known in the art, such as Logical Block Address (LBA) and Logical Unit (LUN). The read request may request any number of units of data, such as byte(s), word(s), and block(s). As discussed earlier, the host device generally does not have information as to whether the requested data ultimately resides in cache memory or on the mass storage media in the storage device. The host address may be mapped to either the mass storage media or the cache or both.

A satisfy operation 506 satisfies the host request received in the receive operation 504. The satisfy operation 506 may read data out of cache memory (for example, the cache 410, FIG. 4) or from a mass data storage media (for example, the disk(s) 240, FIG. 2). In a particular implementation, the satisfy operation 506 involves determining whether the requested data is in the cache memory and, if so, reads the data from cache memory, rather than the mass storage media. In this particular implementation, the satisfy operation 506 may employ a hashing operation to obtain an index into the cache associated with the requested address and/or a hash key. Any other way(s) of satisfying the host request may be employed by the satisfying operation 506.

A generate address operation 508 generates a related address that is related to the received host address. In a particular implementation, the generate address operation 508 obtains an address that is sequentially related to the received host address or other related addresses. In this implementation, an address is obtained that is offset from the requested address or other related addresses. To obtain the related address, the generate address operation 508 may subtract a predetermined offset value from the requested address (or other related address), whereby the related address is logically sequentially prior to the requested address (or other related address).

The predetermined offset that may be used by the generate address operation 508 may be on a page boundary. A page has a size (for example, 64 kilobytes), or granularity, that is implementation specific. In a particular implementation, the page size may be dynamically adjusted. The predetermined offset may be an integer multiple of pages. In one implementation, the integer multiple is four. In another implementation, the integer multiple may be varied, depending on operational parameters, such as cache hit rate, host request sizes, and host workloads.

In another particular implementation of the generate address operation 508, the predetermined offset value is calculated by multiplying a page size value by a look-back value, representing a number of cache pages to look back. By multiplying a page size by a number of pages (i.e., the look-back value), a total address offset is obtained. As discussed below, the page size value and the look-back value may be tuned or adjusted dynamically, whereby a higher cache hit rate may be achieved. The generate address operation 508 may generate the related address that has the same form as the host address (for example, LBA, LUN, etc.) or a form different from that of the host address (for example, a storage device format).

In another particular implementation of the generate address operation 508, the related address(es) may be determined through a mapping operation. In this particular implementation, the requested address may be mapped to one or more related address using a look-up table, a programmable memory device, and the like.

More generally, the generate address operation 508 may generate related addresses that bear a relationship(s) to the requested address (or other related addresses) different from or in addition to a sequential relationship. For example, in a particular implementation, the related address may be part of a RAID stripe that is common to the requested address (or related address). In another implementation, the related address may refer to a disk that is common among the requested or related addresses. Thus, the generate operation 508 may apply any relationship rules suitable to a particular implementation.

A generate index operation 510 generates a cache index referring to a memory location in the cache. The generate index operation 510 may use the related address from the generate address operation 508 to obtain the cache index. In one implementation, the generate index operation 510 utilizes a hash table and a hashing procedure. In this particular implementation of the generate index operation 510, a hash key is generated from the related address. The hash key may then be input into the hash table to determine if the cache includes data corresponding to the hash key, and hence, the related address. If the hash table outputs a valid cache index, then the cache includes data corresponding to the related address.

A first query operation 512 determines whether the cache includes data corresponding to the related address (from the generate address operation 508). As discussed, in one implementation, a hash table can be used to indicate whether the cache includes data associated with the related address. In another implementation, a skip list can be used to indicate whether the cache includes data associated with the related address. In still another implementation, a balanced tree structure can be used to indicate whether the cache includes data associated with the related address.

If data corresponding to the related address is not in the cache, the operation flow 500 branches "NO" from the first query operation 512 to a store operation 514. The store operation 514 may fetch the requested data from the mass storage media and store the data in the cache to increase the likelihood of a cache hit for a subsequent request. After the store operation 512, the operation flow 500 ends at end operation 516. In an alternative implementation, the store operation 514 is skipped, in which case, the operation flow branches "NO" from the first query operation 512 directly to the end operation 516.

Referring to the first query operation 512, if data corresponding to the related address is in the cache, the operation flow 500 branches "YES" to a second query operation 518. The second query operation 518 determines whether another related address should be analyzed. In one implementation, the second query operation 518 checks a "related address count" or look-back (for example, the look-back value of FIG. 6) value that indicates how many related addresses are to be analyzed. As is discussed further below, the "related address count" value may be adjustable in response to relevant operational parameters.

If the second query operation 518 determines that more addresses should be analyzed, the operation flow 500 branches "NO" to the generate address operation 508. During second and subsequent executions of the generate address operation 508, generation of the related address may be based on a prior generated related address or based on the requested address or based on both; that is, an address offset may be obtained from the requested address and/or a prior generated related address.

If the second query operation 518 determines that no more addresses should be analyzed, the operation flow 500 branches "YES" to an initiate operation 520. The initiate operation 520 causes, starts or triggers a read pre-fetch to occur. The read pre-fetch operation involves fetching data from the mass storage device at an address that may be related to the requested address and any related addresses that were generated for analysis. In one implementation, the pre-fetch operation fetches data at an address that is sequentially beyond the requested address and stores the data in the read cache. With the pre-fetched data in the read cache, the likelihood of receiving a subsequent cache hit may be greater.

The initiate operation 520 may initiate the pre-fetch operation any way that may be known in the art. In one implementation, the initiate operation 520 sets a predetermined flag that indicates to a pre-fetch process or other executable code, that the pre-fetch operation is to be executed. In another implementation of the initiate operation 520, a procedure call is made to a pre-fetch operation that executes the pre-fetching. In yet another implementation, the initiate operation 520 sets up and/or launches a pre-fetch process that may be an executable thread or process in the operating system.

FIG. 6 illustrates an operational flow 600 having exemplary operations that may be executed in the systems of FIGS. 1–4 where such systems are capable of adjusting a look-back value based on cache hit rate. In general, the look-back value relates to a desired number of related addresses are to be analyzed (for example, at the query operation 518, FIG. 5). The operation flow 600 may provide a level of adaptation in a storage system by varying the look-back value in response to one or more operational parameters or measurements.

After a start operation 602, a generate operation 604 generates one or more operational parameters. One particular operational parameter that may be generated is a read cache hit rate, as shown in FIG. 6. Those skilled in the art will recognize how to generate a read cache hit rate. In one particular implementation, the read cache hit rate is calculated by dividing a read cache hit count by a disk access count. Alternatively, the read cache hit rate may be calculated by dividing the read cache hit count by a sum of the read cache hit count plus a read cache miss count. Any other method of generating the read cache hit rate as may be known in the art may be implemented in the generate operation 604.

In addition, as discussed above, the generate operation may generate any number of other operational parameters besides or in addition to the read cache hit rate. Other exemplary operational parameters are workload type, host request data sizes, cache memory size, page size, disk response time, and the like. Which particular parameters are generated in the generate operation 604 is implementation specific and may be selected such that any of various performance measures are improved.

A query operation 606 analyzes the operational parameter values, in this case, the hit rate, from the generate operation 604. The query operation 606 may determine whether the hit rate is increasing and/or has reached an optimal level. One skilled in the art will recognize that the optimal level is workload and/or implementation dependent. A hit rate of 100% may not be achievable in many implementations; in a particular implementation, the optimal level is set to a predetermined maximum achievable hit rate. In one implementation, the query operation 606 compares the current hit rate with a previous hit rate to determine whether the hit rate is increasing or decreasing. In this implementation, the query operation 606 may save the current hit rate so that it can be compared later to subsequent hit rates. In another implementation, the query operation 606 compares the hit rate to an optimal hit rate, which may be set when the storage device is manufactured, when the device is initially deployed into operation, and/or when the device boots up.

If the query operation 606 determines that the hit rate has increased and/or has reached an optimal hit rate, the operation flow 600 branches "YES" to an adjust operation 608. The adjust operation 608 adjusts a look-back value. The look-back value can be used during address analysis (for example operation flow 500, FIG. 5) to check whether to analyze more related addresses (for example, the related address count value checked in the query operation 518, FIG. 5). The look-back value may represent a count of addresses or data to analyze in the cache to determine whether related address data is in cache. In one implementation, the look-back value is a number of pages of data. In another implementation, the look-back value is an integer multiple of the page size.

In one implementation of the adjust operation 608 look-back value is decreased by a predetermined amount in response to an unimproved operational parameter, such as hit rate. For example, in this implementation, the look-back value may be decreased from four pages to two pages in cache memory to facilitate identifying sequential workloads. Alternatively, an implementation of the adjust operation 608 may decrement the look-back value by one page (but not below a lower limit) during each iteration. After one or more iterations of the operation flow 600, the look-back value may reach a steady state wherein the hit rate (or other operational parameter) is optimal or close to optimal.

Referring again to the query operation 606, if it is determined that the hit rate has not increased and/or has not reached an optimal value, the operation flow 600, the operation flow 600 branches "NO" to a no change operation 610, wherein the look-back value is not changed. The operation flow 600 ends at end operation 612.

FIG. 7 illustrates an operational flow 700 having exemplary operations that may be executed in the systems of FIGS. 1–4 where such systems are capable of adjusting a page size or granularity based on one or more operational parameters. In general the operation flow 700 obtains an operational parameter that indicates some aspect of performance, checks that operational parameter relative to a desired level of performance, and adjusts the page size if the desired level of performance is not achieved.

After a start operation 702, a generate operation 704 generates one or more operational parameters, such as cache hit rate. The cache hit rate can be generated using any method, such as the methods discussed with respect to the generate operation 604 of FIG. 6. As with the generate operation 604, the generate operation 704 may generate other operational parameters besides or in addition to the read cache hit rate.

A query operation 706 analyzes the operational parameters, in this case, the hit rate, from the generate operation 704. The query operation 706 may determine whether the hit rate is increasing and/or has reached an optimal level. In one implementation, the query operation 706 compares the current hit rate with a previous hit rate to determine whether the hit rate is increasing or decreasing. In this implementation, the query operation 706 may save the current hit rate so that it can be compared later to subsequent hit rates. In another implementation, the query operation 706 compares the hit rate to an optimal hit rate, which may be set when the storage device is manufactured, when the device is initially deployed into operation, and/or when the device boots up.

If the query operation 706 determines that the hit rate has increased and/or has reached an optimal hit rate, the operation flow 700 branches "YES" to an adjust operation 708. The adjust operation 708 adjusts a page size or granularity. The page size represents the size of pages that are addressed in the read cache and can be used during address analysis (for example operation flow 500, FIG. 5) to generate a related address (for example, the generate address operation 508, FIG. 5). The page size value may represent a count of data in a cache page. In a particular implementation, the page size may be adjusted by a predetermined amount, such as thirty-two kilobytes (but not below a lower limit), during each iteration of the adjust operation 708.

After one or more iterations of the operation flow 700, the page size value may reach a steady state wherein the hit rate (or other operational parameter) is optimal or close to optimal.

Referring again to the query operation 706, if it is determined that the hit rate has not increased and/or has not reached an optimal value, the operation flow 700, the operation flow 700 branches "NO" to a no change operation 710, wherein the page size value is not changed. The operation flow 700 ends at end operation 712.

In a particular implementation of a storage device (for example, the storage device 202), the operation flow 600 of FIG. 6, and the operation flow 700 is used in combination. In this implementation, the look-back value may be dynamically adjusted (for example, the operation flow 600) one or more times until an operational parameter is optimized (or made as optimal as possible), followed by dynamically adjusting the look-back value (for example, the operation flow 600) one or more times until the same or another operational parameter(s) is optimized (or made as optimal as possible). In an alternative implementation, the look-back value may be tuned prior to tuning the page size. In yet another implementation, the look-back value is tune in parallel with the page size.

Although the description above uses language that is specific to structural features and/or methodological acts, it is to be understood that the subject matter of the appended claims is not limited to the specific features or acts described. Rather, the specific features and acts are disclosed as exemplary forms of implementation. In addition, the exemplary operations described above are not limited to the particular order of operation described, but rather may be executed in another order or orders and still achieve the same results described.

I claim:

1. A processor-readable medium comprising processor-executable instructions configured for executing a method comprising:
   mapping storage device addresses to cache addresses using a hash table;
   reviewing, in response to a request for data at a first address, a history of memory requests within the hash table to determine if requests for data include addresses sequentially related to the first address; and
   if triggered by discovery of sufficient sequentially related addresses, pre-fetching data, not already in cache, at an address related to the first address.

2. The processor-readable medium of claim 1, wherein reviewing the history of memory requests comprises:
   generating an address related to the first address;
   generating an index associated with the related address using a hash process; and
   checking to see if the index is in the hash table.

3. The processor-readable medium of claim 1, wherein reviewing the history of memory requests comprises:
   dynamically adjusting a look-back value using a cache hit rate as input to the adjustment; and
   utilizing the look-back value to seek addresses based on the first address minus an integer multiple of the look-back value.

4. The processor-readable medium of claim 3, wherein utilizing the look-back value to seek addresses comprises:
   subtracting a multiple of the look-back value from the first address;
   hashing the result of the subtraction; and
   searching for the hashed result in the hash table.

5. The processor-readable medium of claim 1, wherein reviewing the history of memory requests comprises:
   generating a plurality of addresses related to the first address;
   generating a plurality of indexes to the hash table by hashing the plurality of related addresses; and
   checking to see which of the plurality of indexes generated are in the hash table and incrementing a related address count in response.

6. The processor-readable medium of claim 5, wherein the related address count comprises a count of addresses that are sequentially related to the first address, wherein size of the related address count determines if a pre-fetch is triggered.

7. The processor-readable medium of claim 1, wherein pre-fetching data comprises:
   hashing the address related to the first address;
   adding the hash to the hash table; and
   fetching data associated with the address related to the first address and writing the data to cache according to the hash added to the hash table.

8. The processor-readable medium of claim 1, wherein reviewing the history of memory requests comprises:
   hashing the first address offset by a multiple of a look-back value, thereby producing a hashed value; and
   looking for the hashed value within the hash table.

9. The processor-readable medium of claim 8, additionally comprising:
   calculating a cache hit rate; and
   dynamically adjusting the look-back value based upon the cache hit rate.

10. A processor-implemented method for detecting a sequential workload in a storage device, comprising;
   receiving a data request associated with a first address;
   generating addresses related to the first address;
   hashing the related addresses to obtain indexes;
   searching a hash table, configured to map data storage to cache memory, for the indexes; and
   where indicated by the searching, pro-fetching data, not already in cache, from an address related to the first address.

11. The processor-implemented method of claim 10, wherein generating addresses related to the first address comprises subtracting a multiple of a look-back value from the first address.

12. The processor-implemented method of claim 11, additionally comprising:
   calculating a cache hit rate; and
   dynamically adjusting the look-back value based upon the cache hit rate.

13. The processor-implemented method of claim 10, additionally comprising:
   calculating a cache hit rate; and
   adjusting a page size of the cache memory based on the cache hit rate.

14. The processor-implemented method of claim 10, wherein searching the hash table determines if prior requests for data were for addresses sequentially related to the first address.

15. The processor-implemented method of claim 10, wherein searching the hash table triggers a pre-fetch upon detection of a sequentially related workload.

16. A caching system, comprising:
   a mass storage memory;
   a cache memory; and
   an address analysis module configured to detect addresses sequential to an incoming address by creating related addresses by subtracting multiples of a look-back value from the incoming address, hashing the related addresses, and searching for the hashed related addresses in a hash table, wherein the hash table is configured to map addresses between the mass storage memory and the cache memory;
   wherein discovery of a sufficient quantity of the hashed related addresses in the hash table triggers a pre-fetch of data from an address related to the incoming address that has not yet been cached.

17. The caching system of claim 16, wherein the address analysis module is additionally configured for:
   calculating a cache hit rate; and
   dynamically adjusting the look-back value based upon the cache hit rate.

18. The caching system of claim 16, wherein the address analysis module is additionally configured for:
   calculating a cache hit rate; and
   adjusting a page size of the cache memory based on the cache hit rate.

19. The caching system of claim 16, wherein the address analysis module is additionally configured for adjustment of the sufficient quantity triggering a pre-fetch.

20. The caching system of claim 19, wherein the adjustment is based on a cache hit rate.

21. A method of detecting a sequential workload in a storage device comprising:
   receiving a first address;
   determining whether data associated with a number of addresses sequential to the first address has been cached, wherein the determining whether data associated with a number of addresses comprises generating the number of cache indices, each of the cache indices associated with one of the number of addresses, wherein the generating a cache index associated with each of the number of addresses comprises:
      generating the number of hash keys, each hash key associated with one of the number of addresses;
      hashing on the number of hash keys using a hash table; and
      determining whether a cache index exists in the hash table associated with each of the number of hash keys; and
   if the data associated with the number of addresses has been cached, caching data associated with a second address sequentially related to the first address.

22. A storage device comprising:
   a mass storage medium;
   a cache memory in operable communication with the mass storage medium;
   an input/output module operable to receive a request with a first address; and
   an address analysis module in operable communication with the input/output module and operable to detect a sequential host workload based on data in cache memory, wherein the address analysis module is further operable to determine whether the cache memory has data associated with one or more sequentially related addresses sequentially related to the first address;
   wherein the address analysis module determines whether to pre-fetch data based at least in part on data in the cache memory corresponding to a second address, the second address being related to the first address;
   a mapping module in operable communication with the address analysis module, wherein the mapping module is operable to receive a host address and generate a corresponding index into the cache memory, wherein the mapping module comprises:
      a hash table; and
      a hashing module in operable communication with the hash table, operable to generate one or more hash keys, each of the one or more hash keys associated with the one or more sequentially related addresses, use the hash table to hash on each of the one or more hash keys, and determine whether the hash table has a cache index for each of the one or more hash keys.

* * * * *

UNITED STATES PATENT AND TRADEMARK OFFICE
CERTIFICATE OF CORRECTION

PATENT NO. : 7,117,309 B2 Page 1 of 1
APPLICATION NO. : 10/414195
DATED : October 3, 2006
INVENTOR(S) : Brian S. Bearden It is certified that error appears in the above-identified patent and that said Letters Patent is hereby corrected as shown below:

In column 18, line 56, in Claim 10, delete "pro-fetching" and insert -- pre-fetching --, therefor.

Signed and Sealed this

Twentieth Day of July, 2010

David J. Kappos
*Director of the United States Patent and Trademark Office*